Figure 1:
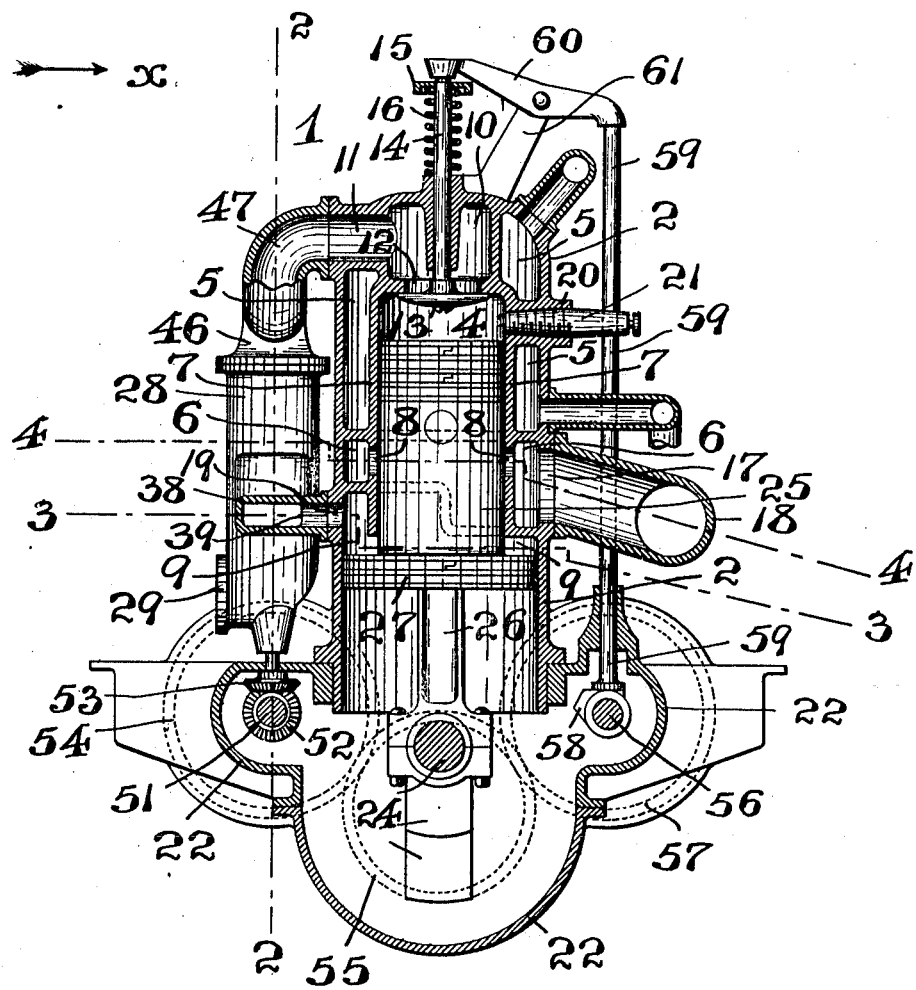

C. M. BILLINGS.
INTERNAL COMBUSTION ENGINE.
APPLICATION FILED JULY 13, 1911.

1,053,700.

Patented Feb. 18, 1913.

3 SHEETS—SHEET 1.

WITNESSES:

INVENTOR:
Cecil M. Billings,
BY
Fraentzel and Richards,
ATTORNEYS

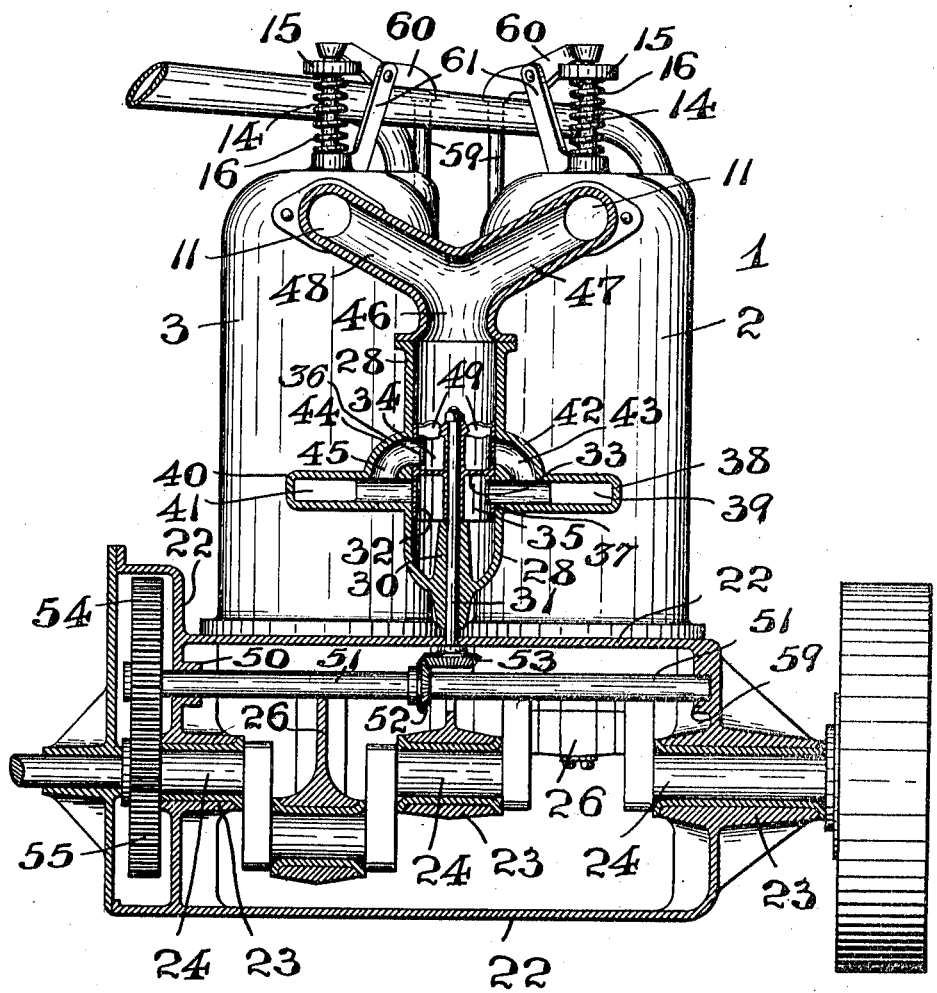

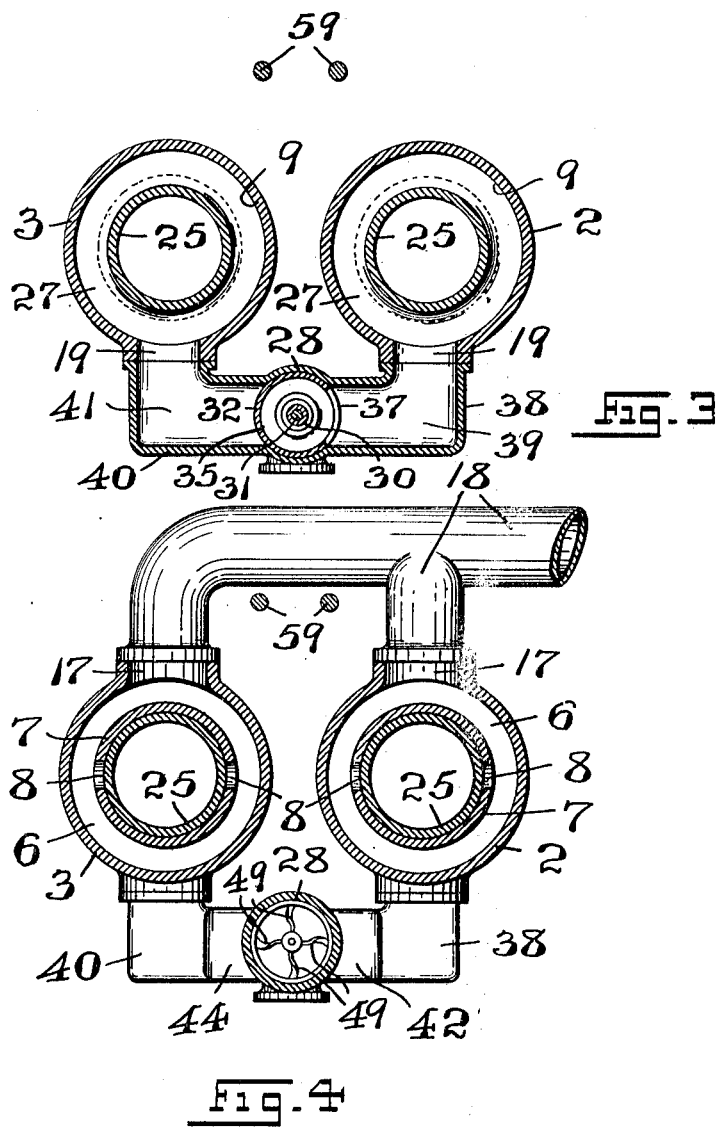

UNITED STATES PATENT OFFICE.

CECIL M. BILLINGS, OF NEWARK, NEW JERSEY, ASSIGNOR OF ONE-HALF TO JOHN G. REICHSTETTER, OF NEWARK, NEW JERSEY.

INTERNAL-COMBUSTION ENGINE.

1,053,700.  Specification of Letters Patent.  Patented Feb. 18, 1913.

Application filed July 13, 1911. Serial No. 638,238.

*To all whom it may concern:*

Be it known that I, CECIL M. BILLINGS, a citizen of the United States, residing at Newark, in the county of Essex and State of New Jersey, have invented certain new and useful Improvements in Internal-Combustion Engines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in internal combustion engines; and, the invention refers, more especially, to improvements in internal combustion engines of the two-cycle type.

The present invention has for its principal object to provide a novel construction of two-cycle internal combustion engine which is provided with a novel means for controlling and properly timing the feeding of the combustible gas to the combustion chambers of the cylinders of the engine.

A further object of the present invention is to provide a novel construction of rotary valve-mechanism, and operating means therefor, adapted to control the passage of the combustible gas from the carbureter into the cylinders of the engine.

Other objects of the present invention, not at this time more particularly enumerated, will be clearly understood from the following detailed description of the same.

With these various objects of the present invention in view, the said invention consists, primarily, in the novel construction of internal combustion engine hereinafter set forth; and, furthermore, the invention consists in the novel arrangements and combinations of the various devices and parts, as well as in the details of the construction thereof, all of which will be more fully described in the following specification, and then finally embodied in the clauses of the claim which are appended to and which form an essential part of this specification.

The invention is clearly illustrated in the accompanying drawings, in which:—

Figure 1 is a transverse vertical section through one of the cylinders of a two-cylinder internal combustion engine made according to and embodying the principles of the present invention; and Fig. 2 is a transverse vertical section, said section being taken on line 2—2 in said Fig. 1, looking in the direction of the arrow *x*. Figs. 3 and 4 are detail horizontal sectional representations taken on line 3—3 and 4—4, respectively, in Fig. 1, looking in downward directions.

Similar characters of reference are employed in all of the hereinabove described views, to indicate corresponding parts.

Referring now to the several figures of the said drawings, the reference-character 1 indicates a complete internal combustion engine made according to and embodying the principles of the present invention, the same comprising a pair of cylinder castings 2 and 3, each cylinder-casting being provided with a combustion chamber 4. Each combustion chamber 4 is surrounded by a suitable chamber 5 which forms a water-jacket for cooling the combustion chamber. Located beneath each chamber 4 is an annular exhaust-chamber 6, the walls 7 of which are provided with suitably disposed ports or openings 8, affording communication between said exhaust chamber 6 and said combustion chamber 4.

Suitably located below each exhaust chamber 6 is a gas-suction chamber 9 suitably formed in the lower portion of each cylinder-casting 2 and 3, and beneath each combustion chamber 4.

Arranged in the head of each cylinder-casting 2 and 3, and above each combustion chamber 4, is a gas-inlet chamber 10, said chamber 10 being provided with inlet passages 11 communicating with the exterior of said cylinder-castings. Connecting said gas-inlet chambers with said combustion chambers 4 are valve-ports 12, which are normally closed by means of puppet-valves 13, the stems 14 of which extend upwardly and outwardly through said cylinder-castings 2 and 3. Each valve-stem 14 is provided with a cap-piece 15 at is free end, suitable coiled springs 16 being arranged between said cap-pieces and said cylinder-castings, to normally maintain said puppet-valves 13 in their closing relation with said valve-ports 12, as will be clearly evident. The outer walls of said cylinder-castings 2 and 3 are provided with exhaust-ports 17, leading from the said exhaust-chambers 6, and suitably connected with the said exhaust-ports 17 are the pipe-connections 18 which carry off the consumed or burnt gases of the engine. In like manner, the outer walls of said cylinder-castings 2 and 3 are provided with gas-ports 19 which lead into said gas-suction-chambers 9. Arranged in an internally threaded receiving portion 20 of each cylinder-casting is a spark-plug 21, the inner end-portion of which penetrates into the said combustion-chambers 4 of said cylinder - castings. Connected with the lower ends of said cylinder-castings 2 and 3 is a suitable crank-casing 22, in the bearings 23 of which is journaled a crank-shaft 24. Arranged so as to reciprocate within the combustion-chamber 4 of each cylinder-casting is a primary piston-member 25, said piston-members being operatively connected with the said crank-shaft 24 by means of the usual connecting rods 26. Connected with the lower ends of said primary piston-members 25, and preferably forming integral parts thereof, are secondary piston-members 27 of enlarged diameter, the same being adapted to reciprocate within said gas-suction chambers 9, simultaneously with the reciprocation of the said primary piston-members 25 within said combustion-chambers 4.

The reference-character 28 indicates a cylindrical rotary-valve casing which is provided at its lower end with an intake port 29 which is connected with the carbureter so as to feed the gas through said rotary valve-mechanism. Connected with the lower end of said rotary-valve casing 28 is a bearing-member 30 in which is journaled a rotary valve-shaft 31 which extends upwardly within said casing 28, and suitably secured to said shaft 31 is a rotary valve-member comprising a cylindrical body 32 having an interiorly arranged transverse wall or partition 33 which divides the interior of said cylindrical body 32 into an upper valve compartment 34 and a lower valve compartment 35. The walls of said cylindrical body 32 are provided with oppositely located valve-ports 36 and 37, said valve-port 36 communicating with said upper valve compartment 34, and said valve-port 37 communicating with said lower valve-compartment 35. Connected with said rotary-valve casing 28, and preferably forming an integral part thereof, is a tubular conduit 38, which extends from one side of said rotary-valve casing and provides a gas-passage 39 in communication with the gas-port 19 of the gas-suction chamber 9 of said cylinder-casting 2; and, in like manner, there is connected with the opposite side of said rotary-valve casing 28, a tubular conduit 40 which provides a gas-passage 41 in communication with the gas-port 19 of the gas-suction chamber 9 of said cylinder-casting 3. The connecting openings between said respective gas-passages 39 and 41 are in the line or path of travel of said valve-port 37 communicating with the lower valve-compartment 35 of said rotary valve-mechanism. Connected with the said tubular conduit 38 is an elbow-connection 42 which provides a by-pass gas-passage 43, affording a communication with said upper valve-compartment 34 through the valve-port 36; and, in like manner, there is connected with the said tubular conduit 40 an elbow-connection 44 which provides a by-pass gas-passage 45, affording a communication with said upper valve compartment 34 through the valve-port 36. The upper open end of said rotary valve - casing 28 is connected with a branch pipe or member 46, the right arm 47 of which communicates with the inlet-passage 11 of the gas inlet-chamber 10 of the cylinder-casting 2, and the left arm 48 of which communicates with the inlet-passage 11 of the gas inlet-chamber 10 of the cylinder-casting 3. Arranged in the open end of said upper valve-compartment 34 of the rotary valve-mechanism are fan-blades or arms 49 which, when said rotary valve is rotated, serve to more thoroughly mix the combustion gas as it passes through said rotary valve-mechanism. Journaled in suitable bearing - portions 50, connected with said crank-casing 22, is a shaft 51 upon which is mounted a gear 52 which meshes with a gear 53 secured to said rotary valve shaft 31. Secured upon said shaft 51 is a gear-wheel 54 which meshes with a driving gear-wheel 55 mounted upon said crank-shaft 24, whereby said shaft 51 is driven and the rotating of the rotary valve-mechanism, in proper time with the movements of the pistons of the engine, is accomplished. A similar shaft 56 is mounted in said crank-casing 22, the same being provided with a gear-wheel 57 which also meshes with said driving gear-wheel 55, whereby said shaft 56 is rotated. Mounted upon said shaft 56 are suitable cam-members 58 which operatively engage the reciprocating rods 59 so as to oscillate their respective puppet-valve levers 60 which are pivotally supported by the carrier-arms 61 suitably connected with the respective cylinder - castings 2 and 3, thus affording a means for operating, in proper time and manner, the respective puppet-valves 13 to admit the combustible gas into the respective combustion chambers 4 of said cylinder-castings 2 and 3.

Having thus described the details of the mechanisms comprising the present invention it remains to describe the operation of the same.

The pistons of the respective cylinder-castings 2 and 3 perform an alternate reciprocation, as is usual in multiple cylinder engines. Upon the firing of the combustible gas delivered to the combustion chamber 4 of said cylinder-casting 2, the primary piston 25 is driven downwardly, so as to cause the secondary piston 27 to move downwardly in the gas-suction chamber 9. The suction created in said gas-suction chamber 9 draws the gas from the carbureter into said rotary valve-casing 28, and into the lower valve-compartment 35, whereby the rotary valve-cylinder 32 is turned into such a position that the valve-port 37 registers with said gas-passage 39. The gas thereupon flows into said gas suction-chamber 9 of the cylinder-casting 2. When the piston 25 of said cylinder-casting 2 reaches the bottom of its stroke, the piston of the cylinder-casting 3 is at the top of its stroke, and the gas which has been previously delivered to the combustion chamber of said cylinder-casting 3 is fired, driving its piston in a downward direction, as the piston in said cylinder-casting 2 moves in an upward direction. The upward movement of the piston 25 and its secondary piston 27 in said cylinder-casting 2 drives the gas out of said gas-suction chamber 9 through said passage 39, and the by-pass gas-passage 43. In the meantime, the rotary valve-cylinder 32 has been turned to close the end of said passage 39 and open the by-pass passage 43, so as to admit the gas through the valve-port 36 and into the upper valve-compartment 34, when it passes through the branch-pipe or member 46. In the meantime, the cam-member operating the puppet-valve admitting the gas into the combustion chamber 4 of said cylinder-casting 3 has opened, so that said fresh charge of gas flows into said combustion chamber 4, driving out the burnt or exploded gases in said cylinder-casting 3 through the exhaust ports and chamber of said cylinder-casting 3. The pistons of said cylinder-casting 2 in the meantime have reached the top of the stroke, and the gas previously delivered to the combustion chamber of said cylinder-casting 2 is fired, whereby the pistons again move downward, and the pistons of said cylinder-casting 3 move upwardly, compressing the gas delivered to the combustion chamber of said cylinder-casting 3 which is again fired when said pistons reach the top of the stroke. The above operations are alternated in each cylinder, as will be clearly apparent. Thus it will be understood, that as one cylinder is fired the piston draws a charge of gas which is to be delivered to the other cylinder through said rotary valve-mechanisms.

I am aware that changes may be made in the various arrangements and combinations of the several devices and parts, and in the features of my present invention, without departing from the scope thereof as described in the foregoing specification, and defined in the claims appended thereto. Hence, I do not limit my invention to the exact arrangements and combinations of the various devices and parts as herein set forth, and as illustrated in the accompanying drawings, nor do I confine myself to the exact details of the construction of the said parts.

I claim:—

1. In an internal combustion engine, the combination with cylinder-castings each respectively provided with a combustion chamber and gas suction-chamber, of a compound piston, comprising a primary piston and a secondary piston reciprocating respectively in said combustion chamber and said gas suction-chamber of each cylinder-casting, a rotary-valve casing provided with means for connecting the same to a carbureter, gas-conduits connecting said rotary-valve casing with the gas suction-chambers of said cylinder castings, a branched pipe connecting said rotary-valve casing with said combustion chambers of said cylinder castings, a rotary-valve mechanism arranged in said rotary valve-casing for alternately opening communication between said gas suction-chambers and the carbureter, and between the gas suction chamber of one cylinder-casting and the combustion chamber of the other cylinder-casting, comprising a cylindrical body open at each end, a transverse partition dividing said cylindrical body into an upper valve-compartment and a lower valve-compartment, said cylindrical body being provided on one side with a valve-port adapted to register with said gas-conduits to establish communication with said upper valve-compartment and on the other side with a valve-port also adapted to register with said gas-conduits to establish communication with said lower valve-compartment, substantially as and for the purposes set forth.

2. In an internal combustion engine, the combination with cylinder-castings each respectively provided with a combustion-chamber and gas suction-chamber, of a compound piston, comprising a primary piston and a secondary piston reciprocating respectively in said combustion chamber and said gas-suction chamber of each cylinder-casting, a rotary-valve casing provided with means for connecting the same to a carbureter, gas-conduits connecting said rotary-valve casing with the gas suction-chambers of said cylinder-castings, a branched pipe connecting said rotary-valve casing with said combustion chambers of said cylinder castings, a rotary valve-mechanism arranged in said rotary-valve casing for alternately opening communication between said gas suction-chambers and the carbureter, and between the gas suction-chamber of one cylinder-casting and the combustion chamber of the other cylinder-casting, comprising a cylindrical body open at each end, a transverse partition dividing said cylindrical body into an upper valve-compartment and a lower valve-compartment, said cylindrical body being provided on one side with a valve-port adapted to register with said gas-conduits to establish communication with said upper valve-compartment and on the other side with a valve-port also adapted to register with said gas-conduits to establish communication with said lower valve-compartment, and means driven from the crank-shaft of said internal combustion engine for operating said rotary valve-mechanism, substantially as and for the purposes set forth.

3. In an internal combustion engine, the combination with cylinder-castings each respectively provided with a combustion chamber and gas suction-chamber, of a compound piston, comprising a primary piston and a secondary piston reciprocating respectively in said combustion chamber and said gas-suction chamber of each cylinder-casting, a rotary-valve casing provided with means for connecting the same to a carbureter, gas-conduits connecting said rotary-valve casing with the gas suction chambers of said cylinder castings, a branched pipe connecting said rotary-valve casing with said combustion chambers of said cylinder castings, a rotary valve-mechanism arranged in said rotary-valve casing for alternately opening communication between said gas suction-chambers and the carbureter, and between the gas suction-chamber of one cylinder-casting and the combustion chamber of the other cylinder-casting, comprising a cylindrical body open at each end, a transverse partition dividing said cylindrical body into an upper valve-compartment and a lower valve-compartment, said cylindrical body being provided on one side with a valve-port adapted to register with said gas-conduits to establish communication with said upper valve-compartment and on the other side with a valve-port also adapted to register with said gas-conduits to establish communication with said lower valve-compartment, a valve-shaft upon which said cylindrical body is mounted, a gear on said valve-shaft, and means for driving said valve-shaft comprising a shaft geared to the crank-shaft of said internal combustion engine, and a gear on said shaft meshing with said gear on said valve-shaft, substantially as and for the purposes set forth.

4. In an internal combustion engine, the combination with cylinder-castings each respectively provided with a combustion chamber, a gas-inlet chamber having a valve-port communicating with said combustion chamber, and a gas suction-chamber, of a compound piston, comprising a primary piston and a secondary piston reciprocating respectively in the combustion chamber and the gas suction chamber of each cylinder-casting, puppet-valves normally closing said valve-port between said gas inlet-chambers and said combustion chambers, means for operating said puppet-valves, a rotary-valve casing provided with means for connecting the same with a carbureter, a rotary valve-mechanism mounted in said rotary-valve casing, comprising a cylindrical body open at each end, a transverse partition dividing said cylindrical body into an upper valve-compartment and a lower valve-compartment, said cylindrical body being provided on one side with a valve-port communicating with said upper valve-compartment and on the other side with a valve-port communicating with said lower valve-compartment, a valve-shaft for rotatably mounting said cylindrical body, oppositely extending tubular conduits connected with said valve-casing and communicating at one end with the gas suction-chambers of said cylinder castings, the other end of said conduits lying in the path of rotation of said valve-port communicating with said lower valve-compartment, an elbow-member connected with each of said conduits and in communication therewith, the passage of said elbow-members lying in the path of rotation of said valve-port communicating with said upper valve-compartment, and a branched-pipe connected with said rotary-valve casing above said rotary valve-mechanism, the same providing connecting gas-passages leading from said valve mechanism to the respective gas inlet-chambers of said cylinder-castings, substantially as and for the purposes set forth.

5. In an internal combustion engine, the combination with cylinder-castings each respectively provided with a combustion chamber, a gas-inlet chamber having a valve-port communicating with said combustion chamber, and a gas suction-chamber, of a compound piston, comprising a primary piston and a secondary piston reciprocating respectively in the combustion chamber and the gas suction-chamber of each cylinder-casting, puppet-valves normally closing said valve-ports between said gas inlet-chambers and said combustion chambers, means for operating said puppet-valves, a rotary-valve casing provided with means for connecting the same with a carbureter, a rotary valve-mechanism mounted in said rotary-valve casing, comprising a cylindrical body open at each end, a transverse partition dividing said cylindrical body into an upper valve-compartment and a lower valve-compartment, said cylindrical body being provided on one side with a valve-port communicating with said upper valve-compartment and on the other side with a valve-port communicating with said lower valve compartment, a valve-shaft for rotatably mounting said cylindrical-body, oppositely extending said tubular conduits connected with said valve-casing and communicating at one end with the gas suction-chambers of said cylinder-castings, the other end of said conduits lying in the path of rotation of said valve-port communicating with said lower valve-compartment, an elbow-member connected with each of said conduits and in communication therewith, the passage of said elbow-members lying in the path of rotation of said valve-port communicating with said upper valve-compartment, and a branched-pipe connected with said rotary-valve casing above said rotary valve-mechanism, the same providing connecting gas-passages leading from said valve-mechanism to the respective gas inlet-chambers of said cylinder-castings, and means driven from the crank-shaft of said internal combustion engine for operating said rotary valve-mechanism, substantially as and for the purposes set forth.

6. In an internal combustion engine, the combination with cylinder-castings each respectively provided with a combustion chamber, a gas-inlet chamber having a valve-port communicating with said combustion chamber, and a gas suction-chamber, of a compound piston, comprising a primary piston and a secondary piston reciprocating respectively in the combustion chamber and the gas suction-chamber of each cylinder-casting, puppet-valves normally closing said valve-port between said gas inlet-chambers and said combustion chambers, means for operating said puppet-valves, a rotary-valve casing provided with means for connecting the same with a carbureter, a rotary valve-mechanism mounted in said rotary-valve casing, comprising a cylindrical body open at each end, a transverse partition dividing said cylindrical body into an upper valve-compartment and a lower valve-compartment, said cylindrical body being provided on one side with a valve-port communicating with said upper valve-compartment and on the other side with a valve-port communicating with said lower valve-compartment, a valve-shaft for rotatably mounting said cylindrical body, oppositely extending tubular conduits connected with said valve-casing and communicating at one end with the gas suction-chambers of said cylinder-castings, the other ends of said conduits lying in the path of rotation of said valve-port communicating with said lower valve-port communicating with said lower valve-compartment, an elbow-member connected with each of said conduits and in communication therewith, the passage of said elbow-members lying in the path of rotation of said valve-port communicating with said upper valve-compartments, and a branched-pipe connected with said rotary-valve casing above said rotary valve-mechanism, the same providing connecting gas-passages leading from said valve-mechanism to the respective gas inlet-chambers of said cylinder-castings, means for rotating said rotary valve-mechanisms comprising a crank-shaft, a shaft geared in connection with said crank-shaft, and a pair of intermeshing gears, one being secured to said shaft and the other to said valve-shaft, sustantially as and for the purposes set forth.

7. In an internal combustion engine, the combination with a pair of cylinder-castings, each cylinder-casting comprising a combustion chamber and a gas-suction chamber, and a reciprocatory piston in each cylinder-casting, of a rotary-valve casing provided with a gas-intake passage, a rotary valve-member within said valve casing, and means connected with said rotary valve-member for dividing said member into an upper and a lower valve-compartment, said rotary valve-member being provided with a valve-port in communication with said upper valve-compartment, said rotary valve being provided also with another valve-port in communication with said lower valve-compartment, and gas-conveying conduits extending from said rotary-valve casing and connected with both the combustion chambers and the gas-suction chambers of said cylinder-castings.

8. In an internal combustion engine, the combination with a pair of cylinder-castings, each cylinder-casting comprising a combustion chamber and a gas-suction chamber, and a reciprocatory piston in each cylinder-casting, of a rotary-valve casing provided with a gas-intake passage, a rotary valve-member within said valve casing, and means connected with said rotary valve-member for dividing said member into an upper and a lower valve-compartment, said rotary valve-member being provided with a valve-port in communication with said upper valve-compartment, said rotary valve-member being provided also with another valve-port in communication with said lower valve-compartment, and gas-conveying conduits extending from said rotary-valve casing and connected with both the combustion chambers and the gas-suction chambers of said cylinder-castings, and fan-blades within the upper valve-compartment of said rotary valve-member.

9. In an internal combustion engine, the combination with cylinder-castings, each cylinder-casting being provided with a combustion chamber and a gas-suction-chamber, of a compound piston within each cylinder-casting, each piston comprising a primary piston and a secondary piston reciprocating respectively within the combustion chamber and the gas suction-chamber of each cylinder-casting, a rotary-valve casing provided with means for connecting the same to a carbureter, gas-conduits connecting said rotary-valve casing with the gas suction-chambers of said cylinder-castings, a branched pipe connecting the outlet end of said rotary-valve casing with the combustion chambers of said cylinder-castings, a rotary-valve mechanism arranged within said rotary-valve casing for alternately opening communication between said gas suction-chambers and the carbureter and also between the gas suction-chamber of one cylinder-casting and the combustion chamber of the other cylinder-casting, said valve-mechanism comprising a cylindrical body open at each end, a transverse partition dividing said cylindrical body into an upper valve-compartment and a lower valve-compartment, said cylindrical body being also provided on one side with a valve-port adapted to register with said gas-conduits to establish communication with said upper valve-compartment, and a valve-port upon the other side of said cylindrical body also adapted to register with said gas-conduits to establish communication with said lower valve-compartment, and fan-blades connected with said cylindrical body, said fan-blades being arranged within said upper valve-compartment and adapted to assist in propelling the gas through the outlet end of said rotary-valve casing, substantially as and for the purposes set forth.

In testimony, that I claim the invention set forth above I have hereunto set my hand this 10th day of July, 1911.

CECIL M. BILLINGS

Witnesses:
FREDK. C. FRAENTZEL,
FREDK. H. W. FRAENTZEL.